United States Patent [19]

Bergmann et al.

[11] 4,386,934
[45] Jun. 7, 1983

[54] NAVY DYE MIXTURES

[75] Inventors: Udo Bergmann, Darmstadt; Helmut Degen, Frankenthal; Guenter Hansen, Ludwigshafen; Reinhold Krallmann, Weisenheim; Wolf-Dieter Kermer, Fussgoenheim, all of Fed. Rep. of Germany

[73] Assignee: BASF Aktiengesellschaft, Ludwigshafen, Fed. Rep. of Germany

[21] Appl. No.: 370,904

[22] Filed: Apr. 22, 1982

[30] Foreign Application Priority Data

May 2, 1981 [DE] Fed. Rep. of Germany ....... 3117366

[51] Int. Cl.³ .......................... C09B 29/00; D06P 1/18
[52] U.S. Cl. ............................................. 8/639; 8/662; 8/696; 8/922
[58] Field of Search ............................................ 8/639

[56] References Cited

U.S. PATENT DOCUMENTS 3,342,804  9/1967  Mueller .................................. 8/524
4,321,055  3/1982  Hansen et al. ......................... 8/639
4,329,148  5/1982  Hansen et al. ......................... 8/639

FOREIGN PATENT DOCUMENTS

54/156875  12/1979  Japan .
56/30463    3/1981  Japan .
1148672     4/1969  United Kingdom .

Primary Examiner—A. Lionel Clingman
Attorney, Agent, or Firm—Oblon, Fisher, Spivak, McClelland & Maier

[57] ABSTRACT

Navy dye mixtures which contain, as essential components, compounds of the general formula I

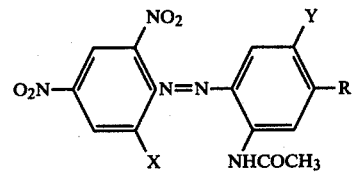

where X is chlorine or bromine, Y is methoxy or ethoxy, and R is

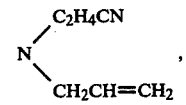

$NHC_2H_4CN$, $NHCH_2CH=CH_2$ or $N(C_2H_4OCOCH_3)_2$, and wherein the dye of the above formula where X is Br, Y is $OCH_3$ or $OC_2H_5$ and R is $N(C_2H_4OCOCH_3)_2$ is present in an amount of 25–45%, based on the total weight of the mixture, are very useful for dyeing synthetic polyesters.

2 Claims, No Drawings

NAVY DYE MIXTURES

The present invention relates to navy dye mixtures which contain, as essential components, compounds of the general formula I

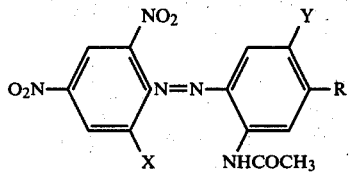

where X is chlorine or bromine, Y is methoxy or ethoxy and R is

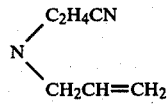

NHC$_2$H$_4$CN, NHCH$_2$CH=CH$_2$ or N(C$_2$H$_4$OCOCH$_3$)$_2$, and wherein the dye of the above formula where X is Br, Y is OCH$_3$ or OC$_2$H$_5$ and R is N(C$_2$H$_4$OCOCH$_3$)$_2$ is present in an amount of 25–45%, based on the total weight of the mixture.

The mixture preferably contains 35–60%, 0.8–12% and 3–20%, respectively, of the dyes where R is

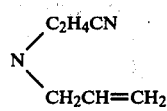

NHC$_2$H$_4$CN and NHCH$_2$CH=CH$_2$.

The novel mixtures possess excellent dyeing and finishing characteristics, and give very fast navy dyeings on synthetic polyesters.

Features to be singled out are the high color strength, the temperature-independent affinity from 120° C. to 140° C., preferably from 125° C. to 135° C., when the dyes are used in the high temperature process, and the low fixing temperature when the dyes are used in the thermosol process.

The novel mixtures may be obtained either by mixing the individual components mechanically or by preparing mixtures separately, by mixed coupling using different diazo components, and then combining these.

In the Examples which follow, and illustrate the preparation and use of the dye mixtures, parts and percentages are by weight, unless stated otherwise.

EXAMPLE 1

Navy dyes of the general formula I

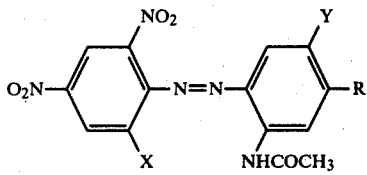

are prepared in a conventional manner and are mixed mechanically to give the novel dye mixtures.

47 parts of the dye where X is Cl, Y is OCH$_3$ and R is

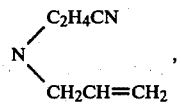

9 parts of the dye where X is Cl, Y is OCH$_3$ and R is NHC$_2$H$_4$CN, 9 parts of the dye where X is Cl, Y is OCH$_3$ and R is NHCH$_2$CH=CH$_2$, and 35 parts of the dye where X is Br, Y is OCH$_3$ and R is N(C$_2$H$_4$OCOCH$_3$)$_2$ are mixed in a ball mill to give 100 parts of a dye mixture according to the invention.

The dye mixture gives fast deep navy dyeings on synthetic polyesters.

EXAMPLE 2

47 parts of the dye where X is Cl, Y is OCH$_3$ and R is

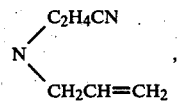

9 parts of the dye where X is Cl, Y is OCH$_3$ and R is NHC$_2$H$_4$CN, 9 parts of the dye where X is Cl, Y is OCH$_3$ and R is NHCH$_2$CH=CH$_2$, and 35 parts of the dye where X is Br, Y is OC$_2$H$_5$ and R is N(C$_2$H$_4$OCOCH$_3$)$_2$ are mixed mechanically to give 100 parts of a dye mixture with the same coloristic properties as the dye mixture of Example 1.

EXAMPLE 3

(a) 524 parts of 2,4-dinitro-6-bromoaniline in 2,100 parts of concentrated sulfuric acid are reacted with 650 parts of nitrosylsulfuric acid of about 42% strength.

(b) 412 parts of 3-(N-alkyl-N-2'-cyanoethylamino)-4-methoxyacetanilide, 61 parts of 3-(N-allylamino)-4-methoxyacetanilide and 58 parts of 3-(N-2'-cyanoethylamino)-4-methoxyacetanilide are introduced into a mixture of 5,000 parts of water, 92 parts of concentrated sulfuric acid and 20 parts of amidosulfonic acid, 7,000 parts of ice are added, and thereafter the mixture is reacted, with stirring and at 0° C. or below, with the diazonium salt solution prepared as described in (a). 1,009 parts of a dye mixture are obtained, which essentially contains dyes of the general formula II

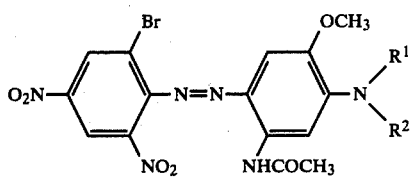

in the following amounts: about 750 parts of the dye where R$^1$ is C$_2$H$_4$CN and R$^2$ is CH$_2$CH=CH$_2$, about 110 parts of the dye where R$^1$ is C$_2$H$_4$CN and R$^2$ is H, and about 120 parts of the dye where R$^1$ is CH$_2$CH=CH$_2$ and R$^2$ is H.

(c) 65 parts of the dye mixture prepared as described in Example 3 (b) are mixed mechanically with 35 parts of the dye of the general formula where X is Br, Y is OCH$_3$ and R is N(C$_2$H$_4$OCOCH$_3$)$_2$. 100 parts of a dye mixture are obtained, which gives very fast deep navy dyeings on synthetic polyesters.

EXAMPLE 4

65 parts of the dye mixture prepared as described in Example 3 (b) are mixed mechanically with 35 parts of the dye of the general formula I where X is Br, Y is OC$_2$H$_5$ and R is N(C$_2$H$_4$OCOCH$_3$)$_2$ to produce 100 parts of a dye mixture which likewise gives very fast deep navy dyeings on synthetic polyesters.

5. DYEING EXAMPLE 1 (high temperature process)

100 parts of a polyester yarn are dyed in a bath containing 2,000 parts of water, 1.5 parts of the finely dispersed dye prepared as described in Example 1, and 2 parts of the product obtained by adduct formation of 50 moles of ethylene oxide with 1 mole of sperm oil alcohol and subsequent sulfonation of the adduct.

Dyeing is begun at 60° C., the temperature is increased to 125° C. in the course of 20 minutes, and dyeing is continued for a further 90 minutes at this temperature.

A very fast deep navy dyeing is obtained.

6. DYEING EXAMPLE 2 (thermosol process)

A polyester fabric is impregnated, on a two-bowl padding mangle, with a liquor which contains, per 1,000 parts, 25 parts of the finely dispersed dye prepared as described in Example 3 (c), 10 parts of a 20% strength aqueous solution of an acrylic acid/acrylamide copolymer, and 965 parts of water.

After impregnation to 60% wet pickup, the fabric is dried at 120° C. and then thermosoled for 45 seconds at 215° C.

A very fast deep navy dyeing is obtained.

7. PRINTING EXAMPLE

A polyester fabric is printed with a paste which contains, per 1,000 parts, 40 parts of the finely dispersed dye prepared as described in Example 4, 600 parts of a starch gum thickener, 20 parts of the reaction product of 1 mole of castor oil with 40 moles of ethylene oxide, 10 parts of triisobutyl phosphate and 330 parts of water.

The printed fabric is dried, and steamed for 15 minutes under a pressure of 1.5 atmospheres.

A very fast deep navy print is obtained.

We claim:

1. A navy dye mixture which contains, as essential components, compounds of the formula I

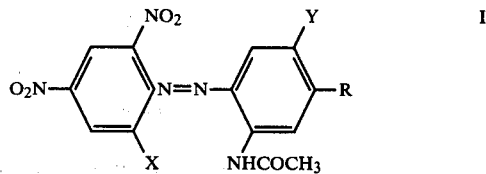

where X is chlorine or bromine, Y is methoxy or ethoxy and R is

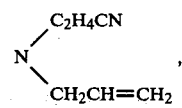

NHC$_2$H$_4$CN, NHCH$_2$CH=CH$_2$ or N(C$_2$H$_4$OCOCH$_3$)$_2$, and wherein the dye of the above formula where X is Br, Y is OCH$_3$ or OC$_2$H$_5$ and R is N(C$_2$H$_4$OCOCH$_3$)$_2$ is present in an amount of 25–45%, based on the total weight of the mixture and wherein the mixture contains 35–60%, 0.8–12% and 3–20% respectively, of the dyes wherein R is

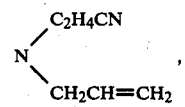

NHC$_2$H$_4$CN and NHCH$_2$CH=CH$_2$.

2. A process of dyeing a synthetic polyester with a dye mixture as claimed in claim 1.

* * * * *